United States Patent [19]

Niederst et al.

[11] 4,191,523
[45] Mar. 4, 1980

[54] PRESS APPARATUS FOR MOLDING SHAPED BODIES FROM FOAMABLE PLASTIC MATERIALS

[75] Inventors: Jean-Pierre Niederst, Bad Salzuflen; Karl Holzinger, Bad Oeynhausen, both of Fed. Rep. of Germany

[73] Assignee: Herbert Kannegiesser Kommanditgesellschaft, Hollwiessen, Fed. Rep. of Germany

[21] Appl. No.: 916,384

[22] Filed: Jun. 16, 1978

[30] Foreign Application Priority Data

Mar. 13, 1978 [DE] Fed. Rep. of Germany ....... 2810789

[51] Int. Cl.² .............................................. B29D 27/00
[52] U.S. Cl. ........................... 425/589; 264/DIG. 83;
425/195; 425/595; 425/408; 425/450.1;
425/451.9; 425/454; 425/817 R
[58] Field of Search .............. 425/4 R, 195, 589, 408,
425/450.1, 451.9, 454, 817 R, 595; 264/51,
DIG. 83

[56] References Cited

U.S. PATENT DOCUMENTS

| 3,642,398 | 2/1972 | Von Rudgisch | 425/4 R X |
| 3,674,408 | 7/1972 | Baumgartner et al. | 425/4 R X |
| 3,765,814 | 10/1973 | Yaita | 264/51 X |
| 3,856,451 | 12/1974 | Holzinger | 264/51 X |
| 3,981,671 | 9/1976 | Edwards | 425/195 X |
| 4,008,990 | 2/1977 | Hiemer et al. | 425/454 |
| 4,083,671 | 4/1978 | Niederst et al. | 425/4 R X |

*Primary Examiner*—Philip Anderson
*Attorney, Agent, or Firm*—Sughrue, Rothwell, Mion, Zinn and Macpeak

[57] ABSTRACT

An apparatus for molding shaped bodies from foamable plastics such as foamable polyurethane resin material comprises a two-piece mold 20, 21 fastened to two clamping plates 17, 18 of a mold holder 11, all of which can revolve around parallel axes 34, 35, 36. The upper plate 18 can move toward the fixed lower plate 17 and back again. The plates are locked and urged together during the molding process by pairs of hydraulic cylinders 28, 29 and 30, 31 mounted on opposite sides of the mold halves 20, 21.

7 Claims, 4 Drawing Figures

PRESS APPARATUS FOR MOLDING SHAPED BODIES FROM FOAMABLE PLASTIC MATERIALS

BACKGROUND OF THE INVENTION

In a known apparatus, U.S. Pat. No. 3,981,671, the mold holder support is constructed in a C-shape. Of the two clamping plates for the parts of the mold that are located one above the other on this C-shaped support, the upper one is placed directly on the upper leg of the support. The lower plate is supported in such a way that it can move up and down, by the lower leg of the support. A base plate is interposed with lift cylinders, and guide rods are provided for the movement of the lower clamping plate back and forth toward the upper clamping plate. The result of this type of support for the lower plate is that it, and consequently the part of the mold on it, are in a comparatively high location in the lowest position, and furthermore, the lower part of the mold always has to be moved up to a high position over a large distance that actually is not necessary when medium-sized and small, or large, flat shaped bodies are being produced. This is because the upper plate is located at a distance from the lower plate which makes it possible also to fasten the parts of molds for the production of larger shaped bodies to the plates. Furthermore, each of the plates can be revolved, by means of working cylinders, around one of the parallel axes corresponding to them by about 45° out of its parallel position to the other fixing plate, so that both plates are opened up approximately like books after the revolving has taken place. The revolving of the mold holder around an axis that is located parallel to the previously-mentioned parallel axes of its clamping plates is produced by working cylinders which are pivoted on the support for the apparatus, on the one hand, and on the C-shaped support of the mold holder, on the other.

In this known apparatus, it is disadvantageous that, as a result of the high location of the lower clamping plate in the basic position, servicing the apparatus is comparatively difficult—for example, when removing foamed shaped pieces from the lower part of the mold and when cleaning and preparing that part of the mold for the next foaming process, and, furthermore, a relatively large amount of time is required for opening and closing the mold when producing medium-sized and small, as well as large, flat shaped bodies. Also the C-shaped construction of the mold holder support is disadvantageous. Because of this construction the mold is accessible from three sides when it is closed, but not in the middle of the fourth side or in the middle from above and below. This has an especially negative effect when making use of an under surface foaming process wherein the materials are injected into the mold from its bottom or underside since it does not permit making use of it under any circumstances.

Another disadvantage of that apparatus is the fact that the forces coming into being during the foaming process go into the C-shaped support of the mold holder, but qualified by the fact that, ultimately, both clamping plates are supported by the jaws of the support. Because of this situation, the maximum foaming pressure must be taken into consideration when designing both the two clamping plates and the C-shaped support if no distortion of the foaming pressure is to take place.

Thus, especially because of its construction, the known apparatus is not particularly easy to service in the first place, has mechanical idle periods that are too long when producing medium-sized and small parts and large, flat pieces in the second place, and, finally, it has an unfavorable force distribution during the foaming process.

SUMMARY OF INVENTION

The object of this invention is to construct apparatus of the type mentioned in such a way that it is easier to service, has shorter mechanical idle periods and has a more favorable force distribution during the foaming process of a foamable plastic material and particularly a foamable urethane resin material than the conventional apparatus referred to.

By means of the construction of the apparatus according to the invention, and specifically by means of the shaping of the support of the mold holder as a rectangular framework, the location of the clamping plates on the front side of the framework and the placement of the upper plate and its support on vertical column sleeves in such a way that it can move up and down, with the column sleeves being located on the left-hand and right-hand sides of the rectangular framework and at the sides of the plates, the apparatus is especially easy to service, always has only the mechanical idle periods resulting from the size of the mold and has the necessary preliminary conditions for obtaining a favorable force distribution during the foaming process. The apparatus of the invention is easier to service than the conventional one because, as a result of the fact that the upper and not the lower plate is supported in such a way that it can move up and down, the lower plate can be located lower than is possible with conventional apparatus. Also, the mold is easily accessible even in the middle of its fourth side and from the rear at that spot as a result of the construction of the support of the mold holder as a rectangular framework and the installation of the column sleeves for the movable plate in the area of the vertical parts of the framework. In particular, the good accessibility of the mold in the middle of its fourth, and rear, side also makes it possible to supply raw material to it in that area. The apparatus of the invention has shorter mechanical idle periods than the conventional apparatus especially because of the fact that the upper and not the lower clamping plate is supported in such a way that it can move up and down and the movable upper plate always only has to be moved over the distance resulting from the size of the mold. Thus, with small, medium-sized and large, flat molds, only a lift adapted to the individual mold is necessary. The preliminary conditions for obtaining a favorable force distribution during the foaming process are provided, in particular, by the construction of the support of the mold holder, the location of the clamping plates on the front side of that framework and the nature of the supporting of the upper plate so that it can move up and down.

By revolving the upper plate 90°, the replacement of the parts of the mold by means of a crane is easily accomplished.

The good acccessibility of the mold in the middle of its fourth, and rear, side is not detracted from by the placement of the lift cylinders. Also, a favorable force distribution during the foaming process is attained. Practically speaking, the forces urging the mold parts together remain in the clamping plates, the lift cylinders and the holding devices, and thus it does not go into the entire support of the mold holder, as in the conventional apparatus. The force distribution is comparable to that of a four-column hydraulic press, in which the four columns are installed in the form of lift or working cylinders. Thus, the support of the mold holder in the form of a rectangular framework does not have to receive any forces resulting from the foaming pressure which actually might distort the framework. The forces going into the lower, horizontal part of the framework are not comparable to the forces that go into the entire C-shaped support of the mold holder in the conventional apparatus. The openings in the middle of the clamping plates permit an especially advantageous supplying of raw materials to the mold in that area, too.

Because of the good accessibility of the mold in the rear, upper and lower areas, the under surface foaming procedure wherein the materials are injected into the mold from its bottom or underside can be carried out advantageously. The mixing heads for the supplying of raw materials can be attached to the mold easily.

Other advantageous features of the invention will be explained in the following by means of an embodiment that is represented schematically in the drawings.

DESCRIPTION OF THE PREFERRED EMBODIMENT

Figure 1:
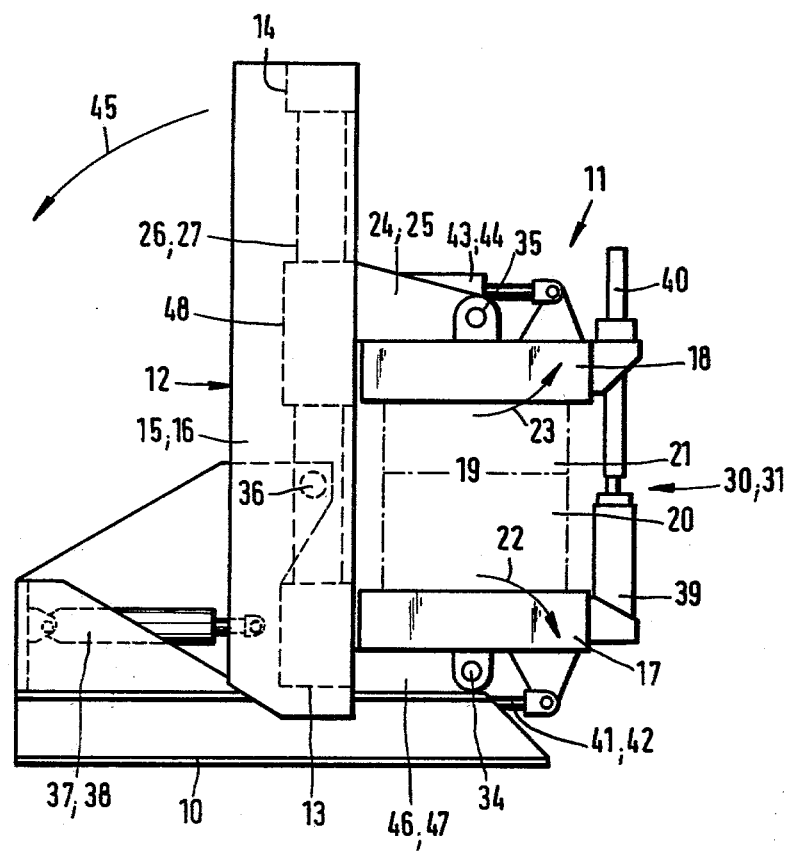
FIG. 1 shows a side view of the apparatus.
Figure 2:
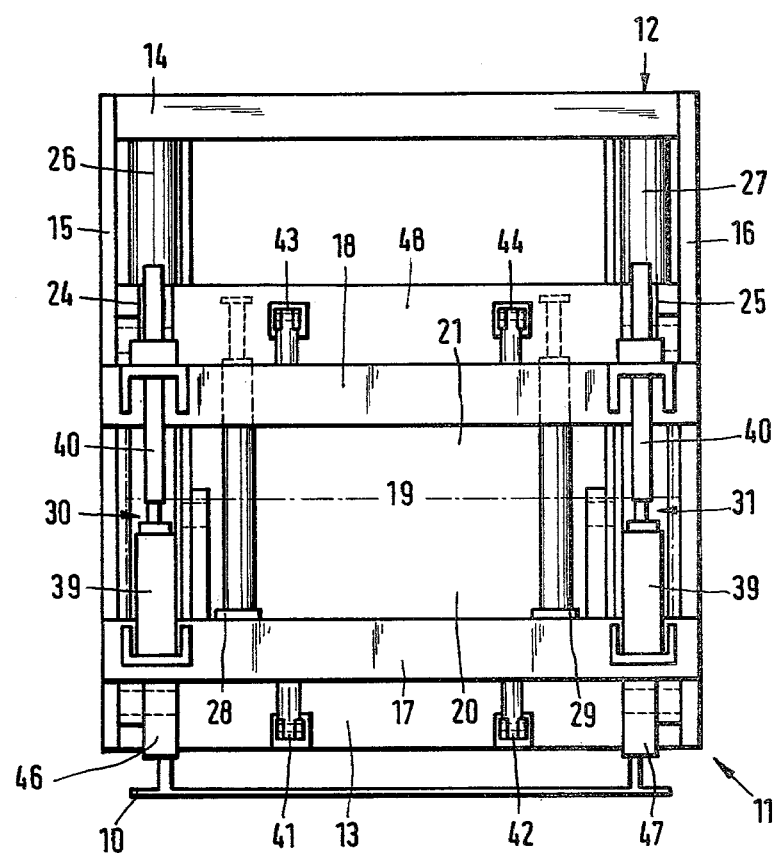
FIG. 2 shows a front view of the apparatus of FIG. 1.
Figure 3:
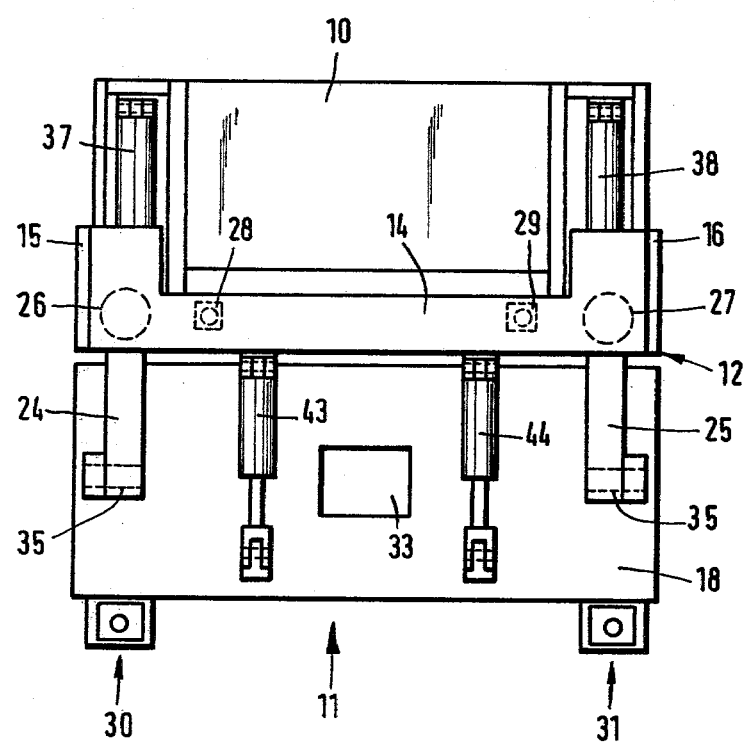
FIG. 3 shows a plan view of the apparatus of FIG. 2.

The apparatus shown in the drawings comprises a support 10, on which a mold holder 11 is supported in such a way that it can be revolved. The mold holder 11 consists essentially of a rectangular framework 12 and clamping plates 17, 18 for parts 20, 21 of a mold 19 which are located on the front side of the rectangular framework and are supported there in such a way that they can revolve. The rectangular framework 12 has two vertical parts 15, 16 which are connected to each other by two horizontal parts 13, 14 in the form of a so-called crown. Because of the construction of the rest of the apparatus, as can be seen in the drawings, but especially because of the dimensions of its clamping plates 17, 18, the framework 12 is rectangular. If the plates 17, 18 have other dimensions and/or other conditions exist, the framework 12 can also be square, for example.

The upper plate 18 is supported on two brackets 24, 25 in such a way that it can revolve, and the brackets are supported on two vertical column sleeves 26, 27 in such a way that they can move up and down. The column sleeves 26, 27 are located in the framework 12 on the left-hand and right-hand sides next to the plates 17, 18. The column sleeves 26, 27 are held at their upper and lower ends in the two horizontal parts 13, 14 of the framework 12. The upper plate 18 can revolve 90° around axis 35 in the direction of the arrow 23 and back again. Thus, the upper plate 18 can be brought from its position parallel to the lower plate 17 to a position at right angles to it, with the mold holder 11 not revolving. The upper plate 18 can be moved up and down by means of two vertical lift cylinders 28, 29 located on the left-hand and right-hand sides of the framework 12 inside the column sleeves 26, 27, and next to the two plates 17, 18.

The lift cylinders 28, 29 are pivoted on one end to the lower horizontal part 13 of the rectangular framework 12, and on the other end of the transverse yoke 48 mounting the brackets 24, 25 and which can thus move up and down. The lower plate 17 is supported in such a way that it can revolve on brackets 46, 47 which are located on the lower horizontal part 13 of the framework 12. The lower plate 17 can revolve 45° around the axis 34 in the direction of the arrow 22 from its position parallel to the upper plate 18 and back again.

For revolving the lower plate 17 and the upper plate 18, two working cylinders 41, 42 and 43, 44 are assigned to each of these two plates.

On the side of the mold holder 11 opposite the framework 12, the column sleeves 26, 27 and the lift cylinders 28, 29—that is, on the actual servicing side of the apparatus—two conventional holding devices 30, 31 are located which, together with the lift cylinders 28, 29, hold the two clamping plates 17, 18 together with the parts 20, 21 of the mold 19 during the foaming process. Each of the two holding devices 30, 31 comprises two units 39, 40 which can be locked together in tension by means of a working cylinder that can act bilaterally, with one of the units being located on the lower plate 17 and one on the upper plate 18. The working cylinder (not shown in the drawing) acting bilaterally is located in the lower unit 39 and has a slide part on its piston rod which is an extension of the piston rod. The slide part can be moved with the piston rod and is shaped like a claw at its upper end in such a way that it is either locked with or unlocked from the part of the other unit 40 that corresponds to it, which also is shaped like a claw by means of the working cylinder in accordance with the movement of the slide part. The locking is comparable to the coupling of two rods to each other, and consequently it is only active in connection with the acting of the working cylinders on the units 39 in regard to holding the parts 20, 21 of the mold 19 together during the foaming process. The details of the units 39, 40 of the holding devices 30, 31 are also not shown in the drawings.

The revolving of the mold holder 11 around the axis 36, which is parallel to the parallel axes 34, 35 of the clamping plates 17, 18 is accomplished by means of the working cylinders 37, 38. The mold holder 11 can be rotated approximately 60° from its vertical position in the direction of the arrow 45 (FIG. 1) and back again.

Each of the two plates 17, 18 has an opening 32, 33 in the middle of it. Each of these openings has a rectangular shape with dimensions of 300×400 mm.

All other devices and parts required to operate the apparatus are not shown in the figures because they are well known and not essential for an understanding of this invention.

Figure 4:
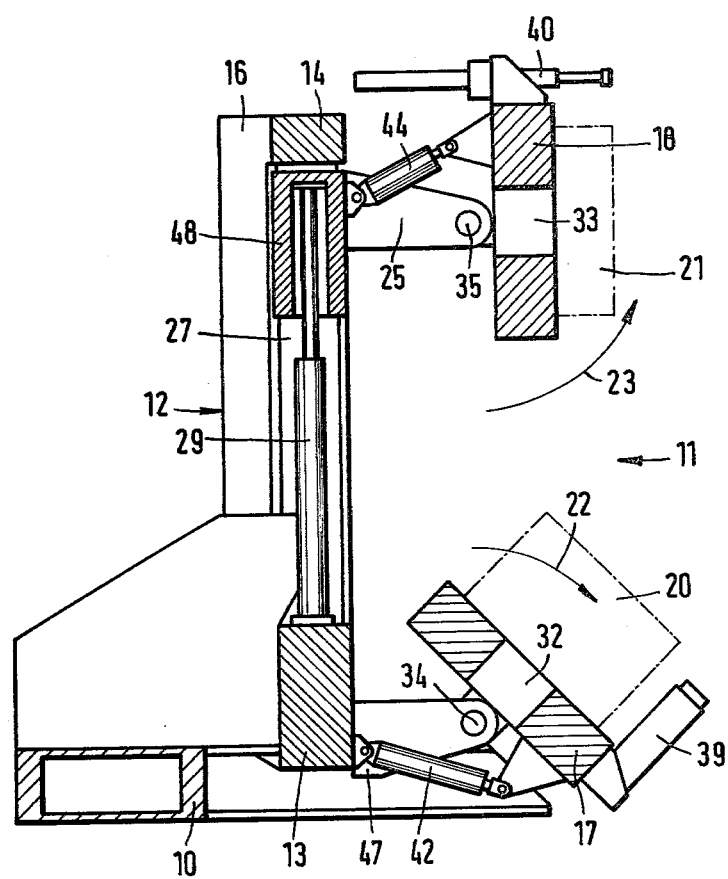
FIG. 4 shows the apparatus of FIG. 1 in cross section, with fixing plates moved apart and revolved.

The apparatus works as follows:

If the clamping plates 17, 18 of the mold holder 11 are initially in the position shown in FIG. 4 to prepare the parts 20, 21 of the mold 19 for the foaming process, they are first revolved into a position parallel to each other by means of the working cylinders 41 through 44. Then the upper plate 18 with the part 21 of the mold 19 is moved toward the lower plate 17 with the part 20 of the mold. The upper plate 18 is moved by means of the two lift cylinders 28, 29. The revolving of the upper plate 18 and the movement of it toward the lower plate 17 can take place simultaneously up to a certain point. When the mold 19 is closed as shown in FIG. 1, the locking of the units 39, 40 of the two holding devices 30, 31 takes place. The locking is implemented by working cylinders located in the units 39. The holding of the clamping plates and mold parts together is thus accomplished by the corresponding action of the two lift cylinders 28, 29 and the two working cylinders of the units 39 of the holding devices 30, 31 by means of hydraulic pressure or the like. If the ventilation of the mold during the foaming process cannot be accomplished in the position of the mold holder shown in FIG. 1, the mold holder 11 may be revolved in the required direction around its axis 36 by means of the working cylinders 37, 38. After the foaming process is concluded, the mold holder is revolved back to its basic position, and then the mold 19 is opened. The opening or pulling apart of the mold 19 is accomplished by action of the two lift cylinders 28, 29 and the working cylinders of the units 39 of the holding devices 30, 31 in opposite directions. When this has been done, the two clamping plates 17, 18 are moved to the position shown in FIG. 4, and then the foamed shaped body (not shown) is removed from the mold by means of conventional elements (not shown). However, opening the mold 19 and/or removing the foamed shaped body from the mold can also be accomplished with the mold holder 11 revolved.

Placing the raw material to be foamed in the mold is accomplished in a known manner, for example by attaching mixing heads (not shown) to the mold 19 in the area of the opening 32 of the plate 17 or to the rear, fourth side of the mold if the under surface foaming procedure wherein the materials are injected into the mold from its bottom or underside is being used. The shape of the body to be foamed and the position of the mold 19 during the foaming process influence this.

What is claimed is:

1. An apparatus for molding shaped articles from foamable plastics material such as a foamable polyurethane resin material, including a base support (10), a mold holder (11) mounted to the support for pivotal movement about a first, generally horizontal axis (36), a pair of clamping plates (17, 18) mounted to the mold holder for pivotal movement about respective second and third axes (34, 35) each parallel to the first axis, said plates being disposed opposite each other and one above the other when said mold holder is in a vertical position, a pair of mating mold parts (20, 21) individually mounted to said clamping plates, and means for moving one of said plates toward and away from the other plate, characterized by:

(a) the mold holder comprising a rectangular frame (12) including horizontal top and bottom members (14, 13) and vertical side members (15, 16),
(b) a pair of vertical guide columns (26, 27) mounted within the frame on opposite sides thereof proximate the vertical side members and adjacent the clamping plates,
(c) a pair of first support arms (46, 47) fixedly mounted to and extending outwardly from said bottom member on a front side of the frame,
(d) means pivotally mounting a lower one (17) of said clamping plates to said first support arms,
(e) a pair of second support arms (24, 25) slidably mounted on and extending outwardly from said guide columns on the front side of the frame,
(f) means pivotally mounting an upper one (18) of said clamping plates to said second support arms, and
(g) means (28, 29) for moving said second support arms, including the upper clamping plate mounted to them, on said guide columns toward and away from the lower clamping plate.

2. Apparatus as claimed in claim 1, wherein the ends of the two guide columns are mounted between the horizontal top and bottom members of the rectangular frame.

3. Apparatus as claimed in claim 1, wherein the upper clamping plate is mounted for pivotal movement through 90° between a position parallel to the lower clamping plate and a position perpendicular thereto.

4. Apparatus as claimed in claim 1, wherein the means for moving the second support arms comprises two fluid cylinder and piston units respectively disposed on opposite sides of the frame proximate the guide columns and adjacent the clamping plates, thereby enabling open access to the clamping plates and mold parts from a back side of the frame.

5. Apparatus as claimed in claim 4, further comprising a transverse yoke (48) mounted between the second support arms, and wherein the cylinder and piston units are mounted between the horizontal bottom member of the rectangular frame and said yoke.

6. Apparatus as claimed in claim 4 or claim 5, further comprising mutually engagable fluid cylinder and piston means (30, 31) mounted between the clamping plates on their side opposite the frame and the guide columns, said cylinder and piston means and units holding the two clamping plates and the parts of the mold together during the foaming process.

7. Apparatus as claimed in claim 1, wherein both the upper and lower clamping plates have rectangular openings in the middle of each plate.

* * * * *